(12) United States Patent
Nakanishi

(10) Patent No.: US 8,369,110 B2
(45) Date of Patent: Feb. 5, 2013

(54) SWITCHING POWER SUPPLY DEVICE OF HALF-WAVE RECTIFICATION CURRENT RESONANCE TYPE AND METHOD FOR STARTING SAME

(75) Inventor: Ryouta Nakanishi, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 749 days.

(21) Appl. No.: 12/549,841

(22) Filed: Aug. 28, 2009

(65) Prior Publication Data

US 2010/0067261 A1 Mar. 18, 2010

(30) Foreign Application Priority Data

Aug. 29, 2008 (JP) .................................. 2008-221965

(51) Int. Cl.
*H02M 3/335* (2006.01)
(52) U.S. Cl. ...................................... 363/21.03
(58) Field of Classification Search ............... 363/21.02, 363/21.03, 21.08–21.18
See application file for complete search history.

(56) References Cited

U.S. PATENT DOCUMENTS 5,925,985 A * 7/1999 Zeng et al. .................. 315/224

FOREIGN PATENT DOCUMENTS

| JP | 2006-50688 A | 2/2006 |
| JP | 2007-20327 A | 1/2007 |
| JP | 2007-189877 A | 7/2007 |

OTHER PUBLICATIONS

International Rectifier, Data Sheet No. PD60029, Sep. 8, 2004, IRF, Rev. J, pp. 1-7.*

* cited by examiner

*Primary Examiner* — Jue Zhang
(74) *Attorney, Agent, or Firm* — Birch, Stewart, Kolasch & Birch, LLP

(57) ABSTRACT

Object of this invention is to prevent deviating increase of switching frequency of a switching element for a half-wave rectification current resonance type switching power supply device in the process of a soft start operation. To solve the object, between output terminals of a direct current power source, a first switching element Q1 and a second switching element Q2 are connected in series. A primary winding of a transformer T1 and a current resonant capacitor Cri are connected to the second switching element Q2 in parallel. A gate control circuit is designed to gradually lengthen the on period of the first switching element Q1 and also designed to shorten the on period of the second switching element Q2 in time of the start operation. This makes it possible to perform a soft start without deviating from the frequency band required for voltage control.

4 Claims, 9 Drawing Sheets

SWITCHING POWER SUPPLY DEVICE OF HALF-WAVE RECTIFICATION CURRENT RESONANCE TYPE AND METHOD FOR STARTING SAME

BACKGROUND OF THE INVENTION

1. Field of the Invention

The present invention relates to a switching power supply device of a half-wave rectification current resonance type. In particular, the present invention relates to a starting method (so-called soft start technique) to be applied when an input power source is turned on, or after the completion of an overcurrent protection operation.

2. Description of the Related Art

Conventionally, switching power supply devices have been used that are designed to receive power from a commercial alternating current power source and supply a predetermined rated level of direct current voltage to a load. In general, such devices are designed to gradually increase an output voltage in order to prevent an overvoltage and/or an overcurrent from occurring during a initial transient period after the application of power, which is generally called a soft start.

For example, a soft start method disclosed in Japanese Patent Application No. 2006-50688 (Patent Document 1) relies on the fact that the higher the switching frequency the lower the output voltage, and that the lower the switching frequency the higher the output voltage. This soft start method operates, if a switching power supply device is of a so-called wide range adaptive type, i.e., the device is able to receive power from a commercial alternating current power source of an AC100V type, an AC 200 V type, etc., so as to gradually decrease a switching frequency from a predetermined frequency in the process of a soft start operation, thereby decreasing at the rate corresponding to the voltage level of the commercial alternating current power source. This soft start method is thereby able to keep the duration of a soft start operation constant no matter what voltage level the commercial alternating current power source to be used provides.

A soft start method disclosed in Japanese Patent Application No. 2007-20327 (Patent Document 2) is designed to gradually lengthen the on period of the high-side switching element. Throughout the period in which this proceeds, the low-side switching element is made to remain off. Alternatively, the on period of the low-side switching element is initially made to be shorter than the off-duty period of the high-side switching element to subsequently be gradually lengthened. A soft start operation is thereby performed.

A soft start method disclosed in Japanese Patent Application No. 2007-189877 (Patent Document 3) is designed such that at the start operation when the direct current power source is turned on, or at the restart of switching after the completion of activation of an overcurrent protection circuit, the on period of the high-side switching element is gradually lengthened. A soft start operation is thereby performed.

FIG. 8 shows one example for a conventional switching power supply device. This switching power supply device is, as shown in FIG. 8, a current resonance type and is designed such that the secondary winding Ns is located on one side of the transformer T1, and on this side, a half-wave rectifying circuit is formed. A switching power supply device of a current resonance type designed in such a way is referred to as a switching power supply device of a half-wave current resonance type. As shown in FIG. 8, and the half-wave rectification current resonance type switching power supply device 100 will be described below.

A direct current power source Vin, a high-side switching element $Q_H$ (first switching element), and a low-side switching element $Q_L$ (second switching element) are connected in series. Reference symbols $D_H$ and $D_L$ each refer to a body diode connected to the high-side switching element $Q_H$ and the low-side switching element $Q_L$ in antiparallel, respectively. Also, a voltage resonant capacitor Crv is connected to the low-side switching element $Q_L$ in parallel. Further, the low-side switching element $Q_L$ has a serial resonant circuit connected thereto in parallel, the serial resonant circuit comprises a reactor Lri, a primary winding Np (exciting inductance Lp) of an output transformer T1, and a current resonant capacitor Cri. The secondary winding Ns of the transformer T1 is connected to a diode RC in series. The secondary winding Ns of the transformer T1 is also connected to a smoothing capacitor Co in series. Direct current power that has been smoothed by a smoothing capacitor Co is supplied to a load Ro. As a high-side switching element $Q_H$ and a low-side switching element $Q_L$, MOSFET (Metal Oxide Semiconductor Field Effect Transistor) or IGBT (Insulated Gate Bipolar Transistor), for example, may be used.

FIG. 9 is a signal waveform diagram of the half-wave rectification current resonance type switching power supply device 100 shown in FIG. 8. The behavior will be described below.

First, the period in which the low-side switching element $Q_L$ is off, and the high-side switching element $Q_H$ is on, i.e., the period t1 to t2 in which the drain-source voltage $V_{QL}$ of the low-side switching element $Q_L$ is at a high level will be described below.

In this period, first, from the direct current power source Vin, via the high-side switching element $Q_H$, the reactor Lri, the primary winding Np (exciting inductance Lp) of the output transformer T1, and the current resonant capacitor Cri, a resonant current $I_{Cri}$ due to the reactor Lri, the primary winding Np (exciting inductance Lp) of the output transformer T1, and the current resonant capacitor Cri passes to charge current resonant capacitor Cri.

Then, the period in which the low-side switching element $Q_L$ is on, and the high-side switching element $Q_H$ is off, i.e., the period t2 to t3 in which the drain-source voltage $V_{QL}$ of the low-side switching element $Q_L$ is at a low level will be described below.

In this period, first, the voltage across the current resonant capacitor Cri is applied to the transformer T1, thereby inverting the polarity of the voltage applied across the transformer T1, which in turn turns on the diode RC connected to the secondary winding of the transformer T1. Thus, in this case, the resonant current $I_{Cri}$ is generated by the resonant circuit comprises the reactor Lri and the current resonant capacitor Cri. The resonant current $I_{Cri}$ decreases due to discharge of the current resonant capacitor Cri so as to finally flow in the opposite direction, which causes energy to be transmitted to the secondary side of the transformer T1. On the secondary side of the transformer T1, the resonant current $I_{Cri}$ charges the smoothing capacitor Co via the diode RC so that direct current power is supplied to the load Ro.

That is, the half-wave rectification current resonance type switching power supply device 100 is designed to continue to charge the current resonant capacitor Cri as long as the low-side switching element $Q_L$ remains off and the high-side switching element $Q_H$ remains on. Also, the half-wave rectification current resonance type switching power supply device 100 is also designed to continue to supply direct current power to the load by transmitting energy to the secondary side of the transformer T1 via discharge of the current resonant capacitor Cri as long as the low-side switching element $Q_L$ remains on and the high-side switching element $Q_H$ remains off. In addition, the switching elements $Q_H$ and $Q_L$ are prevented from being turned on at the same time by turning on the switching elements $Q_H$ and $Q_L$ alternately with a dead time in between. Also, the voltage resonant capacitor Crv serves to subject the high-side and low-side switching elements $Q_H$ and $Q_L$ to a voltage resonance when the high-side and low-side switching elements $Q_H$ and $Q_L$ are turned on or off, respectively.

An amount of energy to be transmitted to the secondary side of the transformer T1 is determined by an amount of charge of the current resonant capacitor Cri. Therefore, an amount of energy to be transmitted to the secondary side of the transformer T1 is able to be controlled by varying the on period (a period from t1 to t2) of the high-side switching elements $Q_H$.

Resonant current generated by the resonant circuit comprises the capacitor Cri and the reactor Lri serves to transmit energy to the secondary side of the transformer T1. Therefore, the period in which energy is transmitted to the secondary side of the transformer T1 is constant. The on period of the low-side switching element $Q_L$ may be fixed.

Therefore, an amount of energy to be transmitted to the secondary side of the transformer T1 is controlled via frequency control designed to make the on period of the high-side switching elements $Q_H$ variable and also designed to fix the on period (t2 to t3) of the low-side switching element $Q_L$. When the on period of the high-side switching elements $Q_H$ is shortened, this causes an amount of charge of the capacitor Cri to be decreased. This in turn causes an amount of energy to be transmitter to the secondary side of the transformer T1 to be decreased. Therefore, at the time of starting, the on period of the low-side switching element $Q_L$ is fixed, and the on period of the high-side switching elements $Q_H$ is gradually lengthened. A soft start is thereby performed.

Patent Document 1 refers to Japanese Patent Application No. 2006-50688.

Patent Document 2 refers to Japanese Patent Application No. 2007-20327.

Patent Document 3 refers to Japanese Patent Application No. 2007-189877.

SUMMARY OF THE INVENTION

In general, if it is possible to increase the on-off switching frequency of a switching element in a switching power supply device, this in turn makes it possible to miniaturize the device. However, when, at the time of the soft start, increasing the circuit frequency, thereby shortening the on period of the high-side switching element $Q_H$, this causes the circuit frequency to exceed the frequency band primarily required for voltage control, thereby increasing frequency change. This makes it difficult to increase the circuit frequency. This constituted a problem.

In view of the above problem, the object of the present invention is to provide a half-wave rectification current resonance type switching power supply device enabling to perform a soft start operation without deviating from the frequency band required for voltage control.

The above object of the present invention is achieved by a switching power supply device of a half-wave rectification current resonance type, the half-wave rectification current resonance type switching power supply device comprising; a serial connection body having a first switching element and a second switching element connected between a pair of terminals of a direct current power source in series, a serial connection body having a primary winding of a transformer and a current resonant capacitor having the second switching element connected in parallel, a half-wave rectifying circuit connecting to the secondary winding of the transformer, and a gate control circuit designing to gradually lengthen an on period of the first switching element in the process of a start operation and also designing to gradually shorten the on period of the second switching element in the process of a start operation.

According to an aspect of the present invention, the above gate control circuit is designed such that the gate control circuit comprises a comparing means, the means designed to compare a reference voltage with the voltage of a sawtooth signal to generate an output signal, the reference voltage designed to change gradually in the process of a start operation or a restart operation; and that the gate control circuit on-off controls the first and second switching elements based on the output signal from the comparing means.

According to another aspect of the present invention, the gate control circuit comprises a sawtooth signal generating circuit, the generating circuit designed to generate the sawtooth signal having a frequency determined by a feedback signal corresponding to an output voltage from the half-wave rectifying circuit.

According to yet another aspect of the present invention, the sawtooth signal generating circuit comprises a constant current charge and discharge circuit, the charge and discharge circuit designed to generate the sawtooth signal by charging and discharging a capacitor via a constant current source.

According to yet another aspect of the present invention, the gate control circuit comprises a soft start signal generating circuit, the generating circuit designed to generate the reference voltage, the generating circuit also designed to be set to an initial value by a pulse signal generated at the time of start or restart, the generating circuit also designed to gradually change to a predetermined stationary value as long as the pulse signal is not generated.

The present invention provides a method for starting a switching power supply device of a half-wave rectification current resonance type, wherein the device comprises a direct current power source and first and second switching elements, the source having a pair of output terminals, and wherein one of the pair of output terminals, the first switching element, the second switching element, and the other of the pair of output terminals are connected in series, the method comprising the step of: performing a control such that the on period of the first switching element is gradually lengthened in the process of a start operation or a restart operation, and that the on period of the second switching element is gradually shortened in the process of a start operation or a restart operation. According to an aspect of the present invention a reference voltage and the voltage of a sawtooth signal are compared, the reference voltage and the sawtooth signal voltage both changing gradually in the process of a start operation or a restart operation, so as to on-off control the first and second switching elements based on the comparison result.

According to another aspect of the present invention, the sawtooth signal is generated with a frequency determined by a feedback signal corresponding to an output voltage.

According to yet another aspect of the present invention, a capacitor is charged and discharged via a constant current source so as to generate the sawtooth signal.

According to yet another aspect of the present invention, the reference voltage that is generated is designed to be set to a predetermined initial valued by a pulse signal generated at the onset of a start operation or a restart operation, the reference voltage also designed to gradually change to a predetermined stationary value as long as the pulse signal is not generated.

The present invention makes it possible to prevent, when performing a soft start operation, the operating frequency from deviating from the frequency band primarily required for voltage control.

DETAILED DESCRIPTION OF THE INVENTION

Then, the present invention will be described below in detail based on the preferred embodiments of the invention with reference to the accompanying drawings.

First Embodiment

Figure 1:
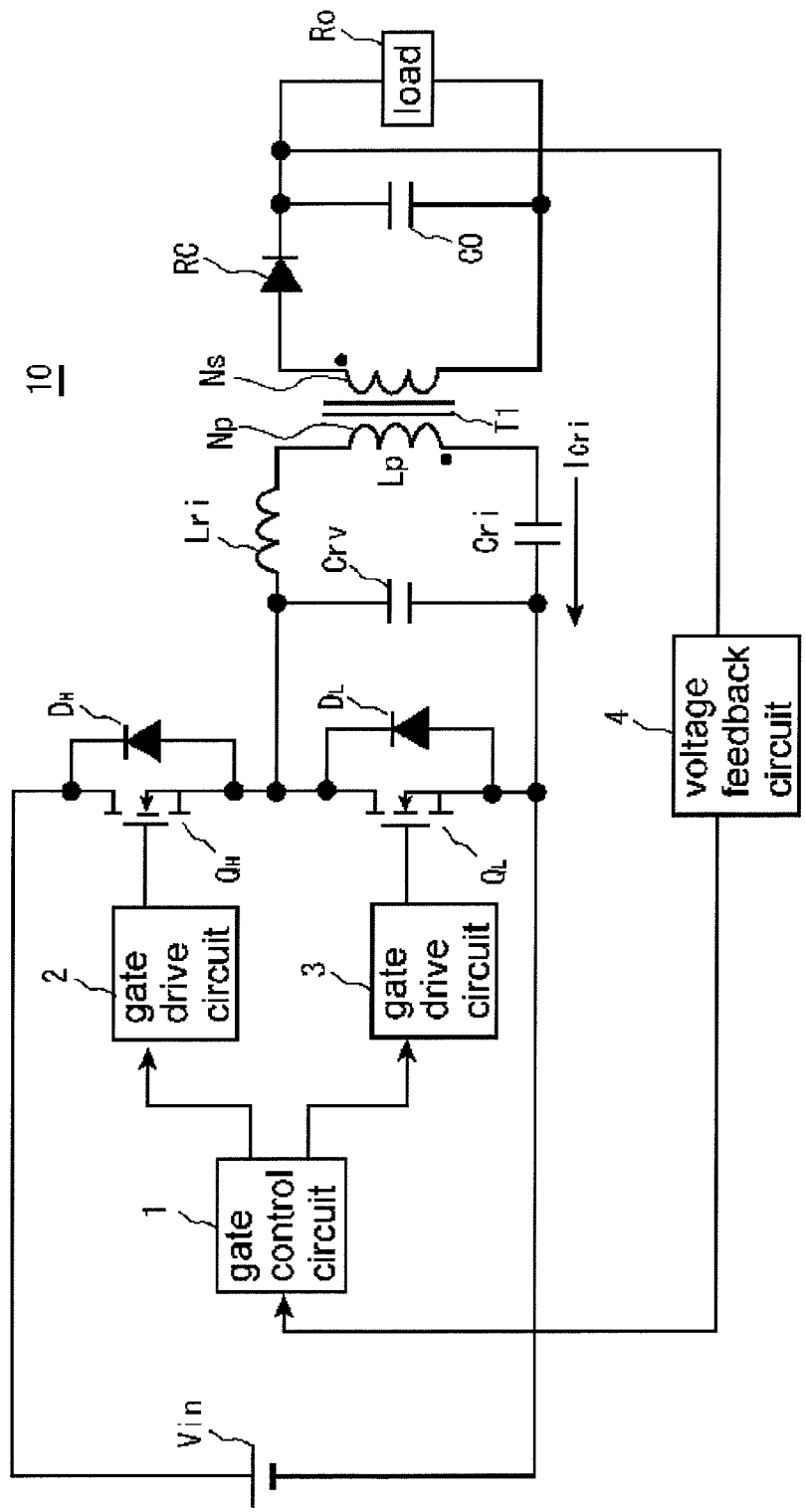
FIG. 1 is a schematic circuit diagram of a half-wave rectification current resonance type switching power supply device according to the first embodiment of the present invention.
Figure 2:
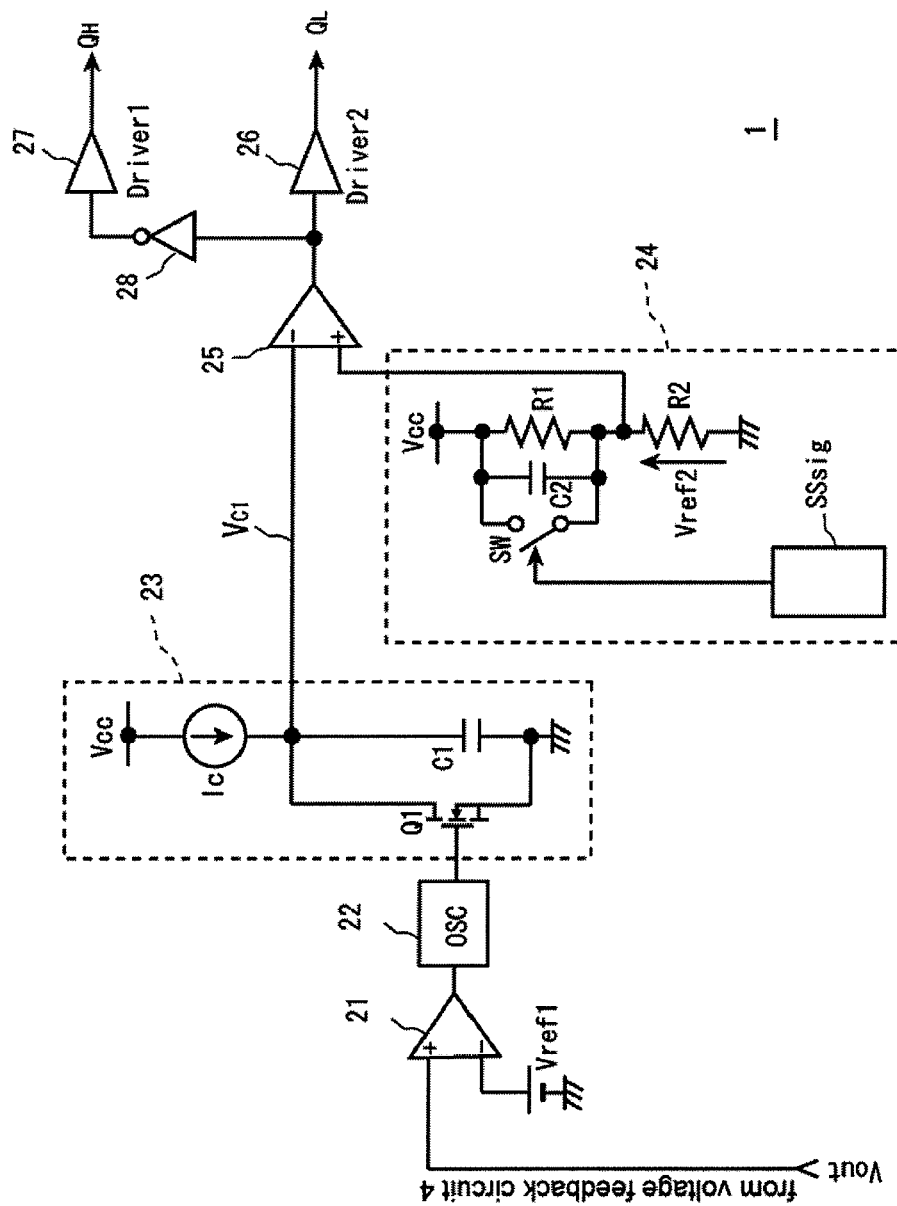
FIG. 2 is a schematic circuit diagram of a gate control circuit in the half-wave rectification current resonance type switching power supply device according to the first embodiment of the present invention.
Figure 8:
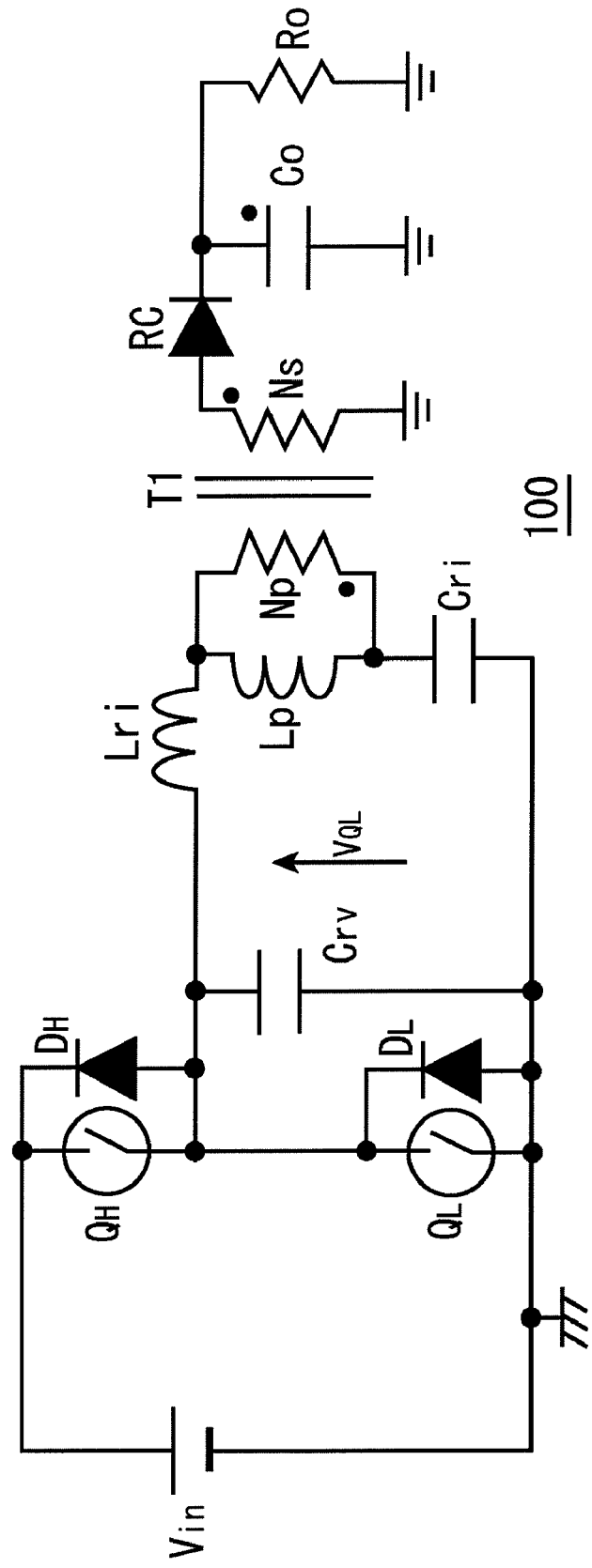
FIG. 8 is a schematic circuit diagram of the conventional half-wave rectification current resonance type switching power supply device.
Figure 9:
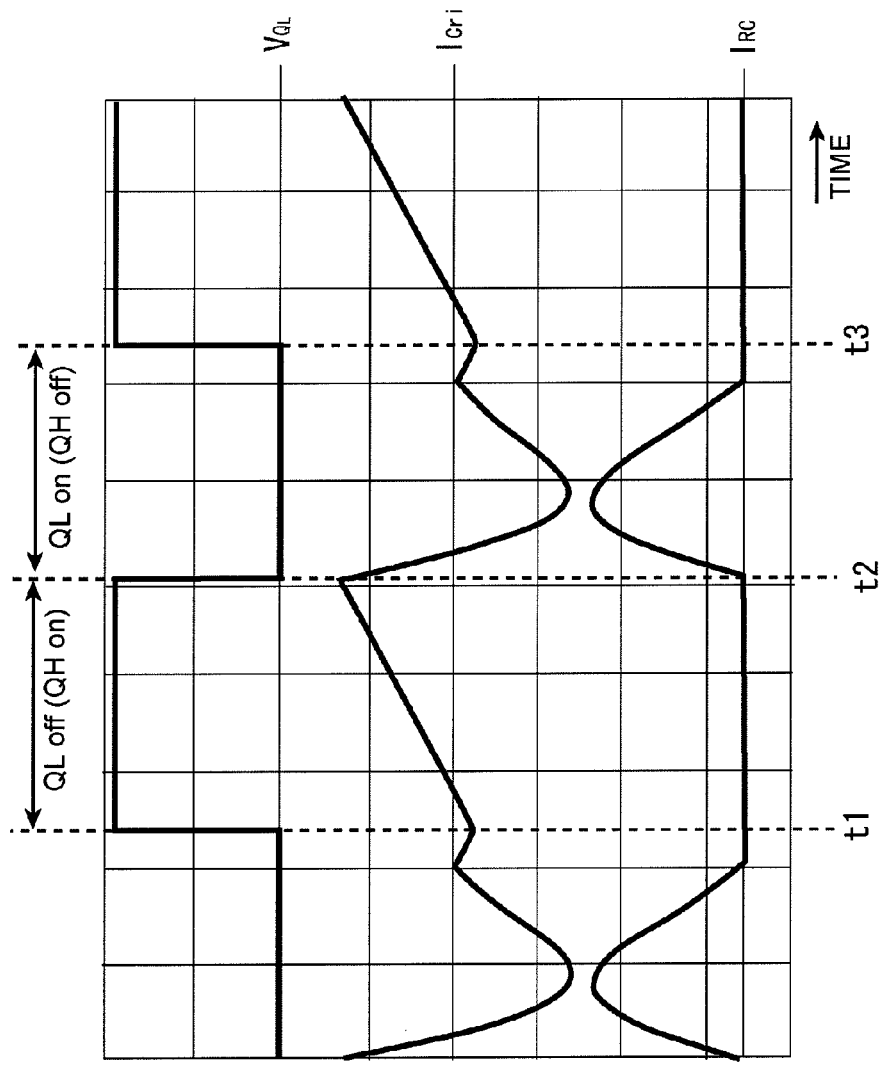
FIG. 9 is a signal waveform diagram of a switching operation performed by the conventional half-wave rectification current resonance type switching power supply device.

FIG. 1 shows a schematic circuit diagram of a switching power supply device according to the first embodiment of the present invention. The switching power supply device in FIG. 1 is a half-wave rectification current resonance switching power supply device. The half-wave rectification current resonance type switching power supply device is referred to with reference number 10 in FIG. 1, and the conventional corresponding device is referred to with reference number 100 in FIG. 8. In half-wave rectification current resonance type switching power supply device 10, structural elements referred to with the same reference numbers in each part of circuit structure common to the half-wave rectification current resonance type switching power supply device 100 shows structural element having the similar function. A high-side switching element $Q_H$ (first switching element) and a low-side switching element $Q_L$ (second switching element) each are implemented by an N-channel MOSFET. FIG. 2 is a detailed circuit structure of the gate control circuit 1 as shown in FIG. 1. The detailed structure of the half-wave rectification current resonance type switching power supply device 10 will be described below based on the first embodiment with reference to FIGS. 1 and 2.

In FIG. 1, reference number 1 refers to a gate control circuit, which generates and outputs gate signals to the high-side switching element $Q_H$ and the low-side switching element $Q_L$. An output signal to be supplied to the high-side switching element $Q_H$ is supplied to a gate terminal of the high-side switching element $Q_H$ via a gate drive circuit 2. An output signal to be supplied to the low-side switching element $Q_L$ is supplied to a gate terminal of the low-side switching element $Q_L$ via a gate drive circuit 3. The high-side switching element $Q_H$ and the low-side switching element $Q_L$ are prevented from being turned on at the same time, which is achieved by turning on alternately with a dead time in between. Either the gate drive circuit 2 or the gate drive circuit 3 generates this dead time in this embodiment. Therefore, gate control circuit 1 shown in FIG. 2 includes no dead time generating circuit. However, it is also possible to make the gate control circuit 1 generate a dead time.

Reference symbol Vin refers to a direct current power source and is implemented, for example, by a power supply circuit, which full-wave rectifies a commercial alternating current power source and smoothes by a capacitor to smooth, and it results full-wave rectified current. This results in a direct current voltage being obtained. The both sides of the direct current power source Vin are connected with a serial connection body that comprises a high-side switching element $Q_H$ and a low-side switching element $Q_L$ implemented by an N-channel MOSFET. The switching element $Q_L$ has a voltage resonant capacitor Crv connected thereto in parallel. Furthermore, the low-side switching element $Q_L$ has the serial connection body connected in parallel thereto, and the serial connection body comprises a reactor Lri, a primary winding Np (exciting inductance Lp) of an output transformer T1, and a current resonant capacitor Cri.

The secondary winding Ns of the output transformer T1 has a serial connection body connected in parallel thereto, and the serial connection body comprises a diode RC and a smoothing capacitor Co. The primary winding Np and secondary winding Ns of the output transformer T1 are wound in such a way of a voltage polarity as indicated by the polarity marks shown, respectively. The diode RC and the smoothing capacitor Co comprises a rectifying and smoothing circuit.

This rectifying and smoothing circuit of diode RC and the smoothing capacitor Co generates a direct current voltage applied across the smoothing capacitor Co. This direct current voltage becomes output voltage of the half-wave rectification current resonance type switching power supply device 10 and supplies a direct current power to a load Ro, which is connected to the smoothing capacitor Co in parallel. Reference number 4 refers to a voltage feedback circuit, which detects a voltage across the smoothing capacitor Co and feeds the detected voltage back to the gate control circuit 1. Subsequently, a gate signal is adjusted based on this detected voltage. This maintains the output voltage at a predetermined value.

Then, a start sequence, for example, at the time of start when the direct current power source Vin is turned on, or at the time of restart after the completion of activation of an overcurrent protection circuit (not shown), i.e., a so-called soft start operation will be described below.

A soft start operation according to this embodiment of the present invention, a the time of start or restart, the on period of the high-side switching element $Q_H$ is shortened, thereby restraining an amount of charge to be applied to the current resonant capacitor Cri, which is similarly performed in the related art. However, in the method according to this embodiment, the on period of the low-side switching element $Q_L$, which is conventionally fixed, is lengthened, thereby shortening the on period of the high-side switching element $Q_H$. Subsequently, the on period of the low-side switching element $Q_L$ is gradually shortened to (a predetermined fixed width). Conversely, in the high-side switching element $Q_H$, the on period is gradually lengthened so as to the on period correspond to the output voltage. In a half-wave rectification current resonant circuit, the period for supplying energy to the secondary side thereof is determined by the resonance caused by the reactor Lri and the current resonant capacitor Cri. Therefore, lengthening the on period of the low-side switching element $Q_L$ does not result in any change in the period for supplying energy to the secondary side. Further, in this connection, it is merely necessary for an operating frequency to vary within the control range. It is not necessary to fix the operating frequency.

As described above, in the present embodiment, the soft start method is designed such that the on period of the high-side switching element $Q_H$ is shortened by lengthening the on period of the low-side switching element $Q_L$. This method serves to restrain increase in the operating frequency. This makes it possible to perform a soft start without deviating from the frequency band required primarily for voltage control despite the frequency control applied.

The gate control circuit 1 will be described below with reference to FIG. 2.

FIG. 2 is a schematic view of one example of control performed by the gate control circuit 1. The gate control circuit 1 comprises an error amplifier 21, an oscillator (OSC) 22, a sawtooth signal generating circuit 23, a soft start signal generating circuit 24, a comparator 25, drivers 26 and 27, an inverter (inverting circuit) 28, etc.

In the error amplifier 21, voltage Vout of the smoothing capacitor Co is applied to the plus (+) input terminal via the voltage feedback circuit 4. The minus (−) input terminal of the error amplifier 21 has a reference voltage Vref1 connected thereto. The error amplifier 21 amplifies the difference between the voltage Vout received by the plus terminal thereof and the reference voltage Vref1 applied by the minus input terminal thereof.

The oscillator (OSC) 22 is connected to the output terminal of the error amplifier 21. Thus, the oscillator 22 generates a pulse having a frequency corresponding to the output signal from the amplifier 21. Then, the pulse generated at the oscillator 22 is output to the gate terminal of the transistor Q1. The transistor Q1 is located within the sawtooth signal generating circuit 23.

The sawtooth signal generating circuit 23 comprises a current source Ic, a transistor Q1, a capacitor C1, etc. The capacitor C1 is connected to the source-drain path of transistor Q1 in parallel. The drain of the transistor Q1 and one end of a connection point of the capacitor C1 are connected to one end of the current source Ic. The other end of the current source Ic is connected to a power source Vcc. Further, the drain of the transistor Q1 and one end of a connection point of the capacitor C1 are connected to the minus input terminal of the comparator 25. Also, the source of the transistor Q1 and the other end of a connection point of the capacitor C1 are grounded. Thus, in the sawtooth signal generating circuit 23 comprised in this case, when the transistor Q1 is turned off, the capacitor C1 is charged from the current source Ic with a predetermined ramp, which the voltage across the capacitor C1 increases with a predetermined gradient. When the transistor Q1 is turned on, this causes the capacitor C1 to be discharged. Namely, the period that the oscillator (OSC) 22 generates the pulse signal and the transistor Q1 is turned on, the capacitor C1 is discharged. Also, during the period that the oscillator (OSC) 22 generates no pulse signal, the transistor Q1 remains off. Thus, the capacitor C1 has a behavior repeatedly charged at a constant current by the current source Ic. This causes the sawtooth signal generating circuit 23 to output a sawtooth signal $V_{C1}$. This sawtooth signal $V_{C1}$ is input to the minus input terminal of the comparator 25. A Zener diode is preferably provided in order to protect the capacitor C1 from being overcharged by the current source Ic.

The soft start signal generating circuit 24 comprises resistors R1 and R2, a capacitor C2, a switch SW, a soft start commanding circuit SSsig, etc. Resistors R1 and R2 are connected in series and are connected between the control power source Vcc and the ground. A partial voltage derived from the voltage of the control power source Vcc is extracted from the connection point between resistors R1 and R1 to be output to the plus input terminal of the comparator 25. Moreover, capacitor C2 is connected to resistor R1 in parallel. Switch SW is also connected to resistor R1 in parallel.

When performing a soft start at the start when applying power, or at the restart after the completion of an overcurrent protection operation, the soft start commanding circuit SSsig outputs a pulse signal having a predetermined width to the switch SW. This causes the switch SW to be turned on. As long as the soft start commanding circuit SSsig outputs no pulse signal, the switch SW remains off. When the soft start commanding circuit SSsig outputs a pulse signal so as to turn on the switch SW, this causes the capacitor C2 to be discharged. This causes the voltage across the capacitor C2 to be decreased to 0 V. This in turn causes a reference voltage Vref2 to increase to the voltage of the power source Vcc. Subsequently, when the soft start commanding circuit SSsig stops outputting any pulse signal, this causes the switch SW to be opened. This in turn causes the capacitor C2 to be gradually charged. While the capacitor C2 is being charged, the voltage Vref2 decreases gradually to finally reach a voltage corresponding to the ratio between the partial voltage across R1 and the partial voltage across R2. The voltage Vref2 is output to the plus input terminal of the comparator 25.

The minus input terminal of the comparator 25 receives a sawtooth signal $V_{C1}$ from the sawtooth signal generating circuit 23. The plus input terminal of the comparator 25 receives a reference voltage Vref2 from the soft start signal generating circuit 24. Subsequently, the comparator 25 compares the sawtooth signal $V_{C1}$ and the reference voltage Vref2 with each other. As long as a period of the reference voltage Vref2 is higher than the sawtooth signal $V_{c1}$, the comparator 25 continues to output a high-level voltage. The comparator 25 outputs thereby a pulse signal having a constant signal period via a driver 26 to the low-side switching element $Q_L$. This causes, in the comparator 25, when the switch SW is on, the on period of the low-side switching element $Q_L$ to be lengthened. On the other hand, this causes, when the switch SW is off, the on period width of the low-side switching element $Q_L$ to be gradually shortened. In the process of this gradual shortening, finally, a signal having a predetermined on period, i.e., a signal having a fixed on period, is output.

The high-side switching element $Q_H$ operates as follows: An output signal from the comparator 25 is inverted by the inverter 28. The resulting inverted signal is output to the high-side switching element $Q_H$ via the driver 27. The high-side switching element $Q_H$ is thereby turned on during the period in which the low-side switching element $Q_L$ is off. This causes the on period of high-side switching element $Q_H$ is thereby shortened when the on period of the low-side switching element $Q_L$ has been lengthened in the process of a soft start operation. This results in shortened charging period of the current resonant capacitor Cri. The amount of energy to be supplied to the secondary side of the transformer T1 is determined by the amount of charge of the current resonant capacitor Cri. Therefore, because the amount of charge of the current resonant capacitor Cri is gradually increased, a soft start can be performed.

An operational sequence of a soft start operation will be described below with reference to FIGS. 3 and 4.

Figure 3:
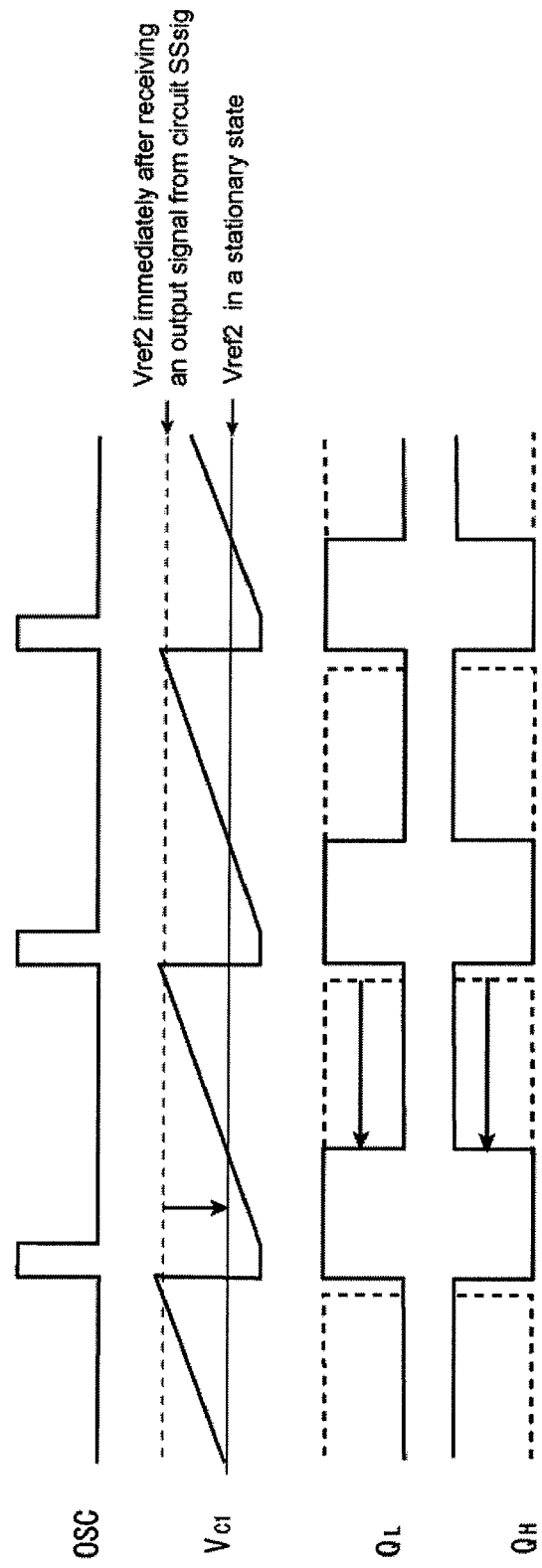
FIG. 3 is a signal waveform diagram of an operational sequence performed by the gate control circuit in the half-wave rectification current resonance type switching power supply device according to the first embodiment of the present invention.

In FIG. 3, a waveform "OSC" refers to an output signal from the oscillator 22. The oscillator 22 outputs a pulse signal with a frequency corresponding to an output voltage from the error amplifier 21.

A waveform "$V_{C1}$" refers to an output from the sawtooth signal generating circuit 23. The waveform $V_{C1}$ continues to have a voltage of 0 V while the output signal of oscillator 22 being output pulse signals (waveform "OSC"). The "$V_{C1}$" builds up gradually as long as the oscillator 22 outputs no pulse signal. The "$V_{C1}$" refers to a sawtooth signal.

A waveform "$Q_L$" refers to an output signal from the driver 26 of the gate control circuit 1. The waveform "$Q_L$" refers to a gate signal to be output to the low-side switching element $Q_L$. A waveform "$Q_H$" refers to an output signal from the driver 27 of the gate control circuit 1. The waveform "$Q_H$" refers to a gate signal to be output to the high-side switching element $Q_H$.

At the waveform "$V_{C1}$", both of "Vref2 (dotted line) immediately after receiving an output signal from SSsig" and "Vref2 (continuous line) in a stationary state" are indicated. The comparator 25 compares "$V_{C1}$" and "Vref2". As can be seen from the waveform "$Q_L$" shown, as long as Vref2 is higher than "$V_{C1}$," the "$Q_L$" remains on. In addition, as long as "Vref2" is lower than "$V_{C1}$", the "$Q_L$" remains off. These can be recognizable. In addition, it is also comprehensible that the waveform $Q_H$ is an inversed signal of the waveform "$Q_L$."

As shown in an arrow, the reference voltage Vref2 changes from the timing immediately to receive an output signal of SSsig (shown by a dotted line) to timing be a stationary state (shown by a continuous line.) In the process of this changing of the reference voltage Vref2, the on period of the waveform "$Q_L$" is gradually shortened. This is shown by an arrow. In addition, the on period of the waveform "$Q_H$" is gradually lengthened. This is also shown by an arrow.

Figure 4:
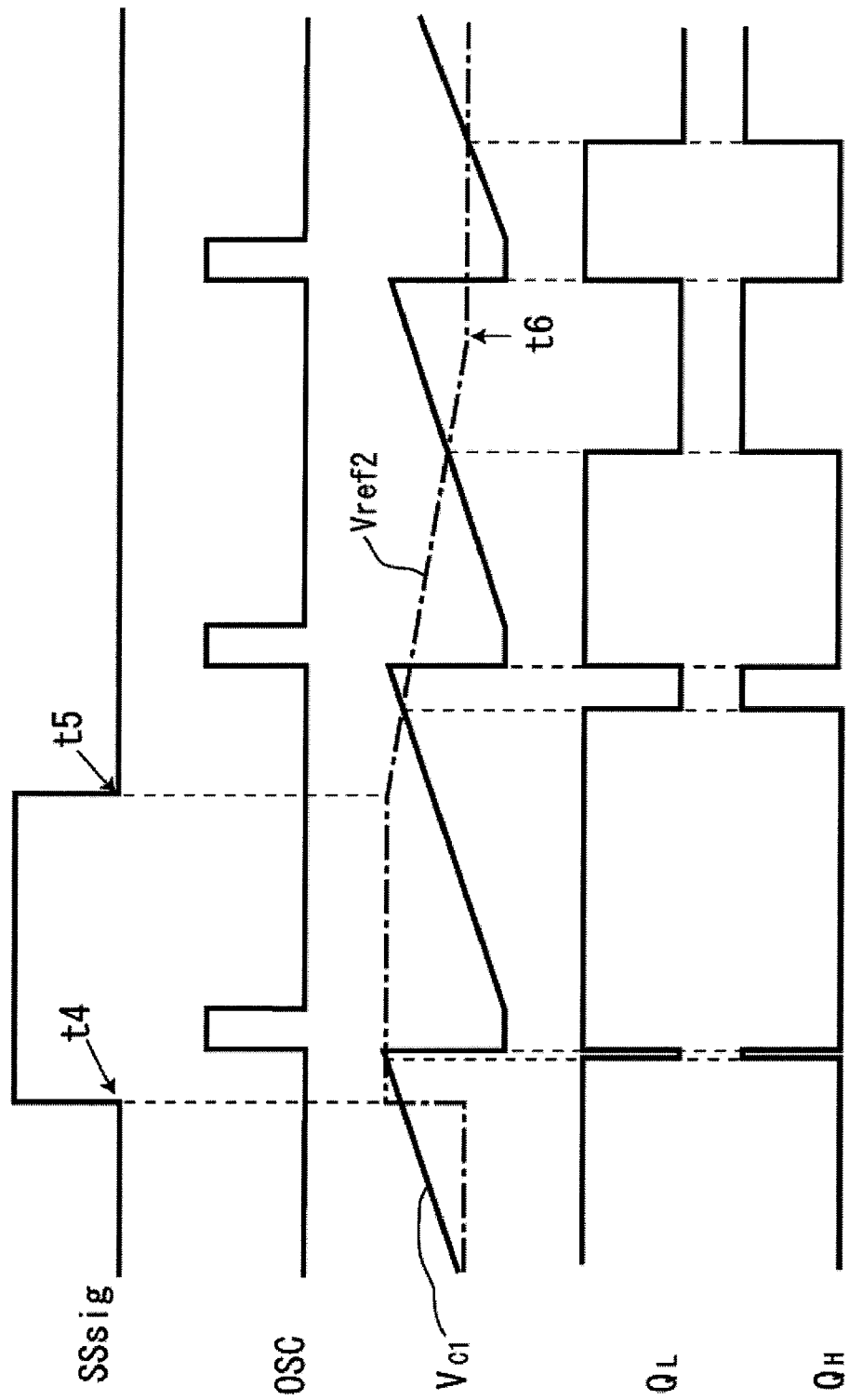
FIG. 4 is a signal waveform diagram of an operational sequence performed by the gate control circuit in the half-wave rectification current resonance type switching power supply device according to the first embodiment of the present invention.

FIG. 4 shows the operation how, at a soft start, the pulse width of each of the waveform "$Q_L$" and the waveform "$Q_H$" changes with changing in the reference voltage Vref2.

In FIG. 4, the symbol SSsig refers to an output signal from the soft start commanding circuit SSsig. This pulse signal may be output in a start operation upon application of power and may also be output in a restart operation after the completion of an overcurrent protection operation. A pulse signal having a predetermined is output as this output signal. The waveform "OSC," the waveform "$V_{C1}$," the waveform "$Q_L$," and the waveform "$Q_H$" in FIG. 4 are the similar wave forms shown in FIG. 3.

At the waveform "$V_{C1}$," a reference voltage Vref2 is indicated by an alternate long and short dash line. Also, the reference voltage Vref2 refers to an output signal from the soft start signal generating circuit 24. In the period from t4 to t5 in which pulse signals are output as "Sssig," the reference voltage Vref2 has a maximum value, which is the voltage of the control power source Vcc. Subsequently, the value of the reference voltage Vref2 is gradually decreased after stopping the output any pulse signal of "Sssig" at the time t5. In the process of this gradual decreasing, finally, the reference voltage Vref2 reaches a stationary state at the time t6. As long as "Vref2" is higher than "$V_{C1}$," the "$Q_L$" remains on. In addition, as long as Vref2 is lower than "$V_{C1}$," "$Q_L$" remains off. As can be seen in the figure, this causes the on period of waveform "$Q_L$" to be gradually shortened. In addition, this causes the on period of "$Q_H$" to be gradually lengthened. They are also recognizable.

As described above, according to the present embodiment, the switching period is determined by the sum of "$Q_H$" and "$Q_L$." This makes it possible to restrain increase in the on-off switching frequency during a soft start operation as compared with the conventional technology that the period about "$Q_L$" is fixed. This in turn makes it possible to perform a soft start without deviating from the frequency primarily required for voltage control.

Second Embodiment

Figure 5:
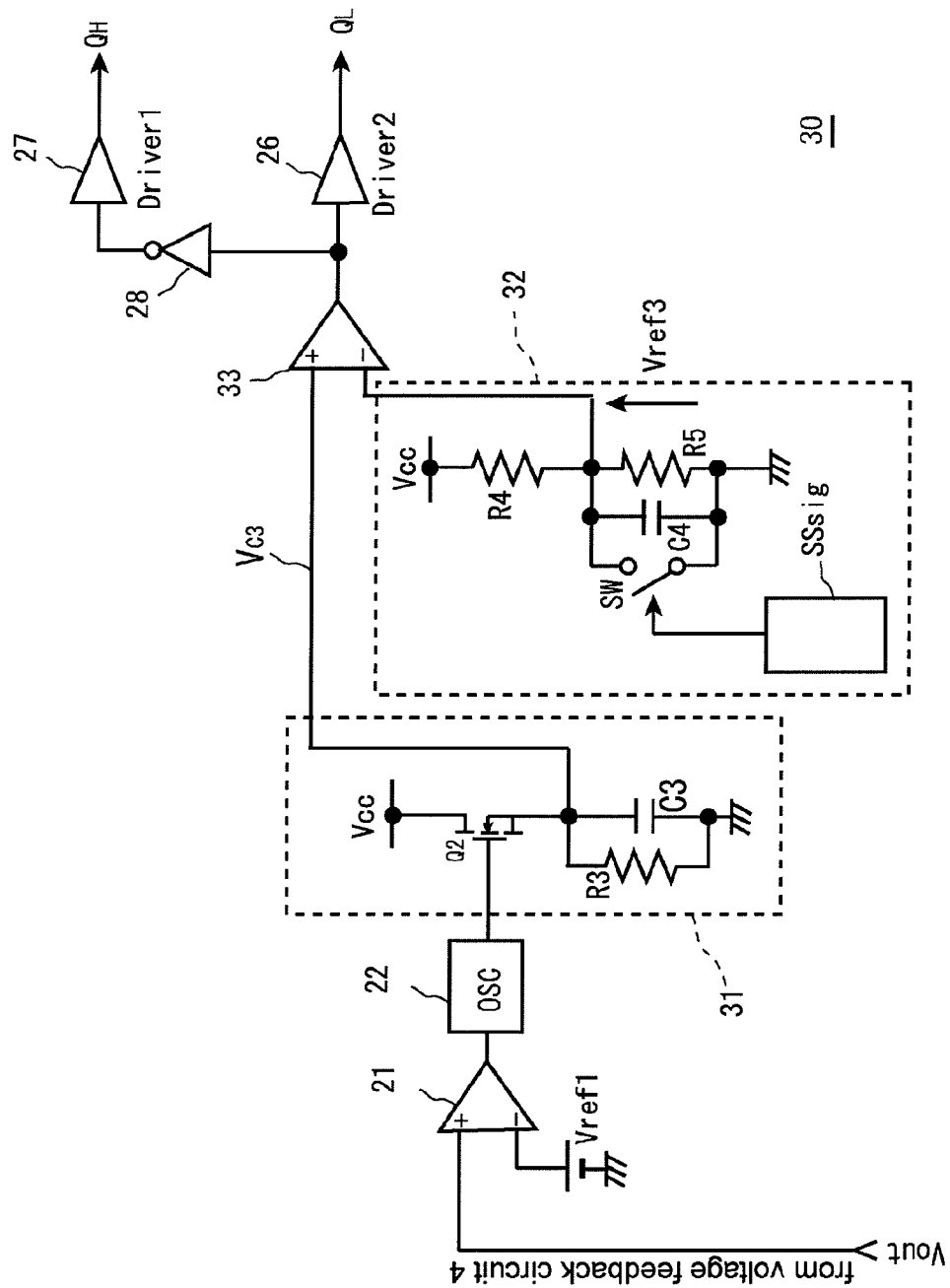
FIG. 5 is a schematic circuit diagram of a gate control circuit in the half-wave rectification current resonance type switching power supply device according to the second embodiment of the present invention.

FIG. 5 is a schematic view of a gate control circuit according to the second embodiment by the present invention.

The gate control circuit 30 shown in FIG. 5 and the gate control circuit 1 shown in FIG. 2, which is in the first embodiment, have the following differences: First, a sawtooth signal generating circuit 31 shown in FIG. 5 is replaced by the sawtooth signal generating circuit 23 is shown in FIG. 2. Second, a soft start signal generating circuit 32 shown in FIG. 5 is changed by the soft start signal generating circuit 24 is shown in FIG. 2. Third, the output of the sawtooth signal generating circuit 31 is connected for the plus input terminal of a comparator 33. Fourth, the output for the reference voltage Vref3 of the soft start signal generating circuit 32 is connected to the minus input terminal of the comparator 33. Otherwise, the second embodiments is similar to the component of the first embodiment.

The sawtooth signal generating circuit 31 comprises a transistor Q2, a capacitor C3, a resistor R3, etc. Resistor R3 and capacitor C3 are connected in parallel, and one end of a connection point is connected to the source terminal of the transistor Q2. The other end of the connection point of the resistor R3 and capacitor C3 is grounded. Also, the one connection point of the source terminal of the transistor Q2 with the resistor R3 and the capacitor C3 is connected to the plus input terminal of the comparator 33. The drain terminal of the transistor Q2 is connected to the control power source Vcc. The output of the oscillator (OSC) 22 is connected to the gate terminal of the transistor Q2.

Thus, in the sawtooth signal generating circuit 31 comprised as this way, when the transistor Q2 is turned on, this causes the capacitor C3 to be charged by the control power source Vcc. On the other hand, when the transistor Q2 is turned off, this causes the capacitor C3 to be discharged via the resistor R3. That is, first, when a pulse signal is generated from the oscillator (OSC) 22, thereby turning on the transistor Q2, this causes the capacitor C3 to be charged. Second, as long as the period that no pulse signal is generated by the oscillator (OSC) 22, the capacitor C3 is to be discharged. Third, all this behavior is repeated. This causes the sawtooth signal generating circuit 31 to output a sawtooth signal $V_{C3}$. The sawtooth signal $V_{C3}$ is input to the plus input terminal of the comparator 33. Regarding this case, a means to discharge the capacitor C3 may be also implemented by a constant current source.

The soft start signal generating circuit 32 comprises resistors R4 and R5, a capacitor C4, a switch SW, a soft start commanding circuit SSsig, etc. Resistors R4 and R5 are connected in series and connected between the control power source Vcc and the ground. A partial voltage derived from the voltage of the control power source Vcc is extracted from the connection point between resistors R4 and R5 to be output to the minus input terminal of the comparator 33. Also, the resistor R5 is connected to the capacitor C4 and the switch SW, in parallel.

When performing a soft start at the time of start when applying of power, or a the time of restart after the completion of an overcurrent protection operation, first, the soft start commanding circuit SSsig outputs a pulse signal having a predetermined width to the switch SW. This turns on the switch SW. As long as the soft start commanding circuit SSsig outputs no pulse signal, the switch SW remains off. When the soft start commanding circuit SSsig outputs a pulse signal so as to turn on the switch SW, this causes the capacitor C4 to be discharged. This causes the voltage across the capacitor C4 to be decreased to 0 V. This in turn causes a reference voltage Vref3 to reach the ground level. Subsequently, when the soft start commanding circuit SSsig stops outputting any pulse signal, this causes the switch SW to be opened. This in turn causes the capacitor C4 to be gradually charged. While the capacitor C4 is being charged, the voltage Vref3 increases gradually to finally reach a voltage corresponding to the ratio between the partial voltage across R4 and the partial voltage across R5. This voltage of Vref3 is output to the minus input terminal of the comparator 33.

The plus input terminal of the comparator 33 receives the sawtooth signal $V_{C3}$ from the sawtooth signal generating circuit 31. The minus input terminal of the comparator 33 receives the reference voltage Vref3 from the soft start signal generating circuit 32. Subsequently, the comparator 33 compares the sawtooth signal $V_{C3}$ and the reference voltage Vref3 with each other. As long as the reference voltage Vref3 is lower than the sawtooth signal $V_{C3}$ the comparator 33 continues to output a high-level voltage. The comparator 33 outputs thereby a pulse signal having a predetermined period to the low-side switching element $Q_L$ via the driver 26. This causes, in the comparator 33, when the switch SW is on, the on period of the low-side switching element $Q_L$ to be lengthened. When the switch SW is turned off, the on period width of the low-side switching element $Q_L$ is gradually shortened. Thus, finally, a signal having a predetermined on period, i.e., a signal having a fixed on period, is output.

Regarding the high-side switching element $Q_H$, an output signal from the comparator 33 is inverted by the inverter 28. Subsequently, the inverted signal is output to the high-side switching element $Q_H$ via the driver 27. Thus, the high-side switching element $Q_H$ is thereby turned on during the period in which the low-side switching element $Q_L$ is off. Thus, the on period of the high-side switching element $Q_H$ is shortened when the on period of the low-side switching element $Q_L$ has been lengthened in the process of a soft start operation. This shortens the charging period of the current resonant capacitor Cri. The amount of energy to be supplied to the secondary side of the transformer T1 is determined by the amount of charge of the current resonant capacitor Cri. Therefore, by increasing the amount of charge of the current resonant capacitor Cri gradually, a soft start may be thereby performed.

Figure 6:
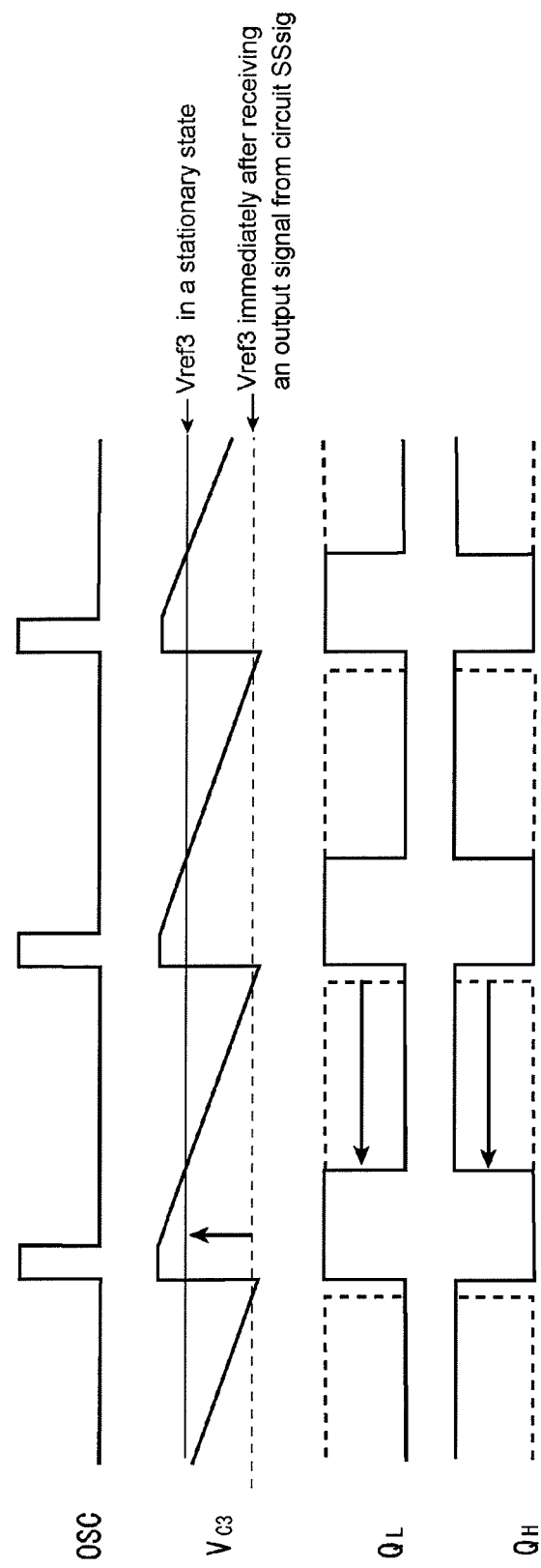
FIG. 6 is a signal waveform diagram of an operational sequence performed by the gate control circuit in the half-wave rectification current resonance type switching power supply device according to the second embodiment of the present invention.

FIG. 6 is a schematic view of signal waves associated with the gate control circuit 30.

In FIG. 6, the waveform "OSC" refers to an output signal from the oscillator 22. The output signal is a pulse signal, and the pulse signal is output with a frequency corresponding to an output voltage from the error amplifier 21.

The waveform "$V_{C3}$" refers to an output signal from the sawtooth signal generating circuit 31. The waveform "$V_{C3}$" continues to have a voltage equal to that of the control power source Vcc while the output (waveform "OSC") of the oscillator 22 is outputting pulse signals. As long as the output (waveform "OSC") of the oscillator 22 outputs no pulse signal, the voltage of the waveform "$V_{C3}$" continues to gradually decrease. Thus, the waveform "$V_{C3}$" becomes a sawtooth signal.

The waveform "$Q_L$" refers to an output signal from the driver 26 in the gate control circuit 30. This output signal is a gate signal to be output to the low-side switching element $Q_L$. The waveform "$Q_H$" refers to an output signal from the driver 27 in the gate control circuit 30, and this output signal is a gate signal to be output to the high-side switching element $Q_H$.

At the waveform "$V_{C3}$," "Vref3 (dotted line) immediately after receiving SSsig" and "Vref3 (continuous line) in a stationary state" are indicated. The comparator 33 compares "$V_{C3}$" and "Vref3." As can be seen from the waveform "$Q_L$," as long as Vref3 is higher than "$V_{C3}$," "$Q_L$" remains off. In addition, as can be seen, as long as "Vref3" is lower than "$V_{C3}$," "$Q_L$" remains on. In addition, the waveform "$Q_H$" is the inversed signal of the waveform "$Q_L$." This is recognizable.

After the termination of signals from SSsig, the reference voltage Vref3 begins to change, as shown by an arrow, from the state (shown by a dotted line) immediately after the input thereof toward the stationary state (continuous line). The on period of the waveform $Q_L$ is gradually shortened, as shown by an arrow. "$Q_H$" is changed as the on period is gradually lengthened, as shown by an arrow.

Thus, as with the first embodiment, this embodiment is able to restrain increase in the on-off switching frequency during a soft start operation. This makes it possible to perform a soft start without deviating from the frequency band required primarily for voltage control.

Third Embodiment

Figure 7:
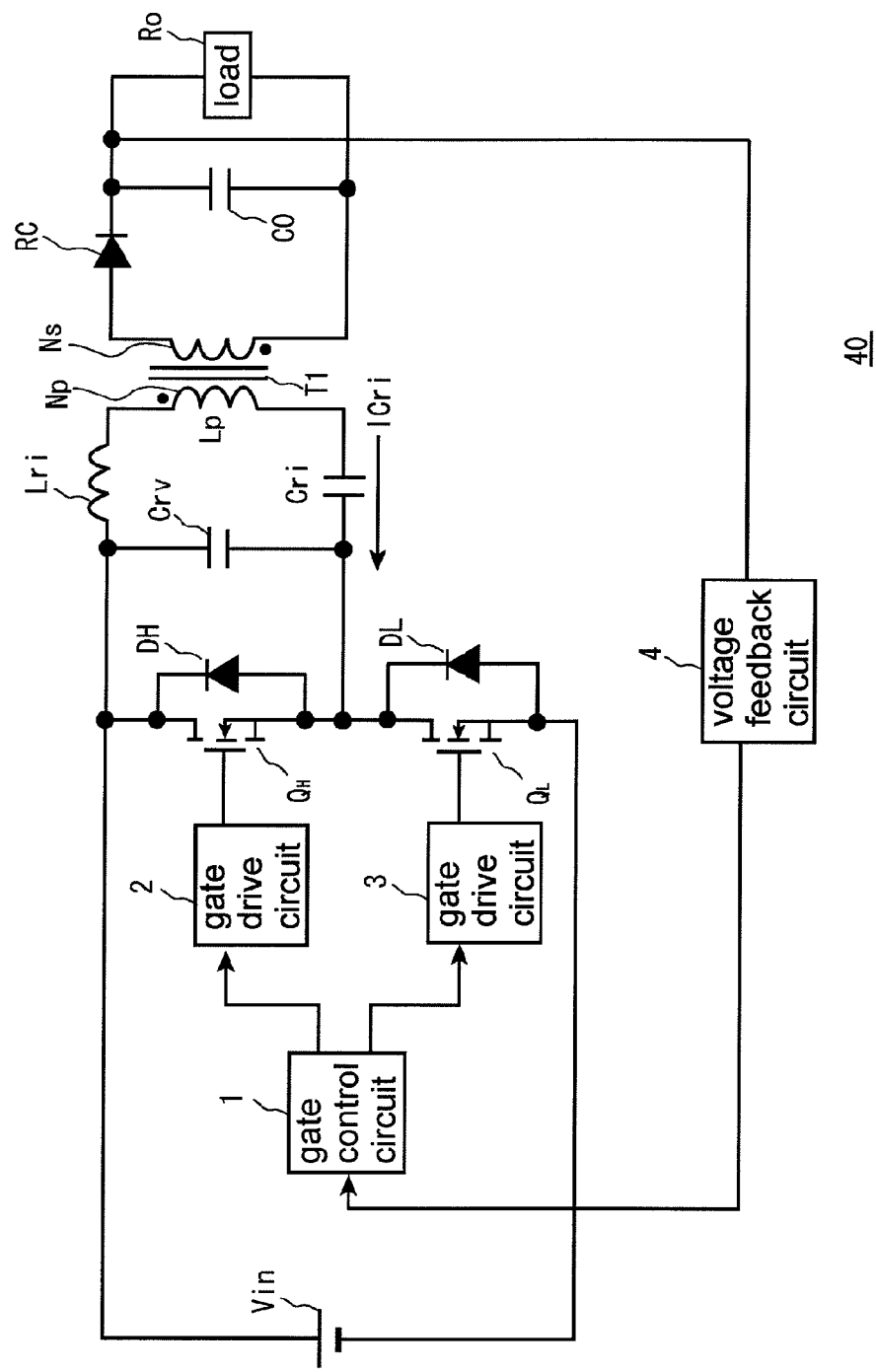
FIG. 7 is a schematic circuit diagram of the half-wave rectification current resonance type switching power supply device according to the third embodiment of the present invention.

FIG. 7 is a schematic circuit diagram of a switching power supply device according to the other embodiment of the present invention, and the device is of a half-wave rectification current resonance type.

As shown in FIG. 7, the half-wave rectification current resonance type switching power supply device is referred to with reference number 40. The half-wave rectification current resonance type switching power supply device 40 shown in FIG. 7 differs from the corresponding device 1 shown in FIG. 1 in how and where a resonant circuit is connected therein. (This difference applies also to the relationship between this embodiment and the second embodiment.) More specifically: In the first embodiment, as shown in FIG. 1, the voltage resonant capacitor Crv, the reactor Lri, the primary winding Np (exciting inductance Lp) of the output transformer T1, and the current resonant capacitor Cri are connected in series, thereby forming a serial resonant circuit. This serial resonant circuit is connected to the low-side switching element $Q_L$ in parallel. By contrast, in this embodiment, the corresponding serial resonant circuit is connected to the high-side switching element $Q_H$ in parallel. Furthermore, in the secondary winding Ns of the transformer T1, the diode RC is connected in series. The diode RC has the connected thereto in series. Finally, the smoothing condenser Co has the diode RC connected thereto in series. This enables a direct current power smoothed by the smoothing capacitor Co to be supplied to the load Ro.

In this embodiment, the high-side switching element $Q_H$ and the low-side switching element $Q_L$ each act reversely with respect to that in the first embodiment. That is, the high-side switching element $Q_H$ in this embodiment acts as the low-side switching element $Q_L$ (second switching element) in the first embodiment. In addition, the low-side switching element $Q_L$ in this embodiment act as the high-side switching element $Q_H$ (first switching element) in the first embodiment. This results in reversed control of a gate signal.

In other aspects, this embodiment is similar to the first embodiment. These other aspects of this embodiment may be easily understood by analogy with the first embodiment. Therefore, the description of these aspects is omitted herein.

The soft start operation described above is also applicable to the half-wave rectification current resonance type switching power supply device, which is configured as described above, and substantially the same advantageous effect is obtained as that described above.

The invention has been described above based on the preferred embodiments by way of examples; these examples merely illustrate the invention, and the invention is not limited thereto.

For example, the high-side switching element $Q_H$ and the low-side switching element $Q_L$ each have been described with reference to a MOSFET as an example. However, an IGBT or FET not of MOS type but, for example, of a junction type may be also used.

Moreover, if the output transformer Tr1 has sufficient leakage reactance, the transformer Tr1 may also act as the reactor Lri. This renders the reactor Lri unnecessary.

What is claimed is:

1. A half-wave rectification current resonance type switching power supply device comprising:
    a serial connection body having a first switching element and a second switching element connected between a pair of terminals of a direct current power source in series, a serial connection body having a primary winding of a transformer and a current resonant capacitor having the second switching element connected in parallel;
    a half-wave rectifying circuit connecting to a secondary winding of the transformer; and
    a gate control circuit designing to gradually lengthen an on period of the first switching element in the process of a start operation and designing to gradually shorten the on period of the second switching element in the process of a start operation, wherein the gate control circuit comprises,
        a comparing means configured to compare a reference voltage with the voltage of a sawtooth signal, both changing gradually form a start or a restart to generate an output signal; and
        a sawtooth signal generating circuit designed to generate the sawtooth signal having a frequency determined by a feedback signal corresponding to an output voltage from the half-wave rectifying circuit, wherein the gate control circuit on-off controls the first and second switching elements based on the output signal from the comparing means, and wherein the sawtooth signal generating circuit comprises a constant current charge and discharge circuit designed to generate the sawtooth signal by charging and discharging a capacitor via a constant current source.

2. The device according to claim 1, wherein the gate control circuit comprises a soft start signal generating circuit designed to be set to an initial value by a pulse signal generated at the start or the restart, designed to gradually change to a predetermined stationary value as long as the pulse signal is not being generated, and designed to generate the reference voltage.

3. A method for starting a half-wave rectification current resonance type switching power supply device having a first switching element and a second switching element connected between a pair of terminals of a direct current power source in series, the method comprising:
    lengthening gradually an on period of the first switching element at the start or the restart and gradually shortening the on period of the second switching element in the process of a start operation or a restart operation;
    comparing a reference voltage and the voltage of a sawtooth signal both changing gradually from a start or a restart, and controlling the on-off state of the first and the second switching elements based on the comparison result;
    generating the sawtooth signal with a frequency determined by a feedback signal corresponding to an output voltage; and
    charging and discharging a capacitor via a constant current source so as to generate the sawtooth signal.

4. The method of claim 3, wherein generating the reference voltage designed to be set to a predetermined initial valued by a pulse signal is configured to be generated at the start or the restart and designed to gradually change to a predetermined stationary value as long as the pulse signal is not being generated.

* * * * *